June 1, 1926.

L. NICHOLS 1,586,913

STALK CUTTER

Filed Nov. 9, 1925

Levi Nichols, Inventor

Witnesses

By Richard B. Owen, Attorney

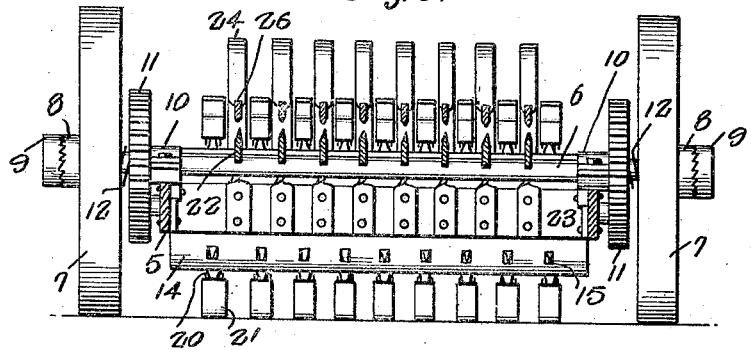
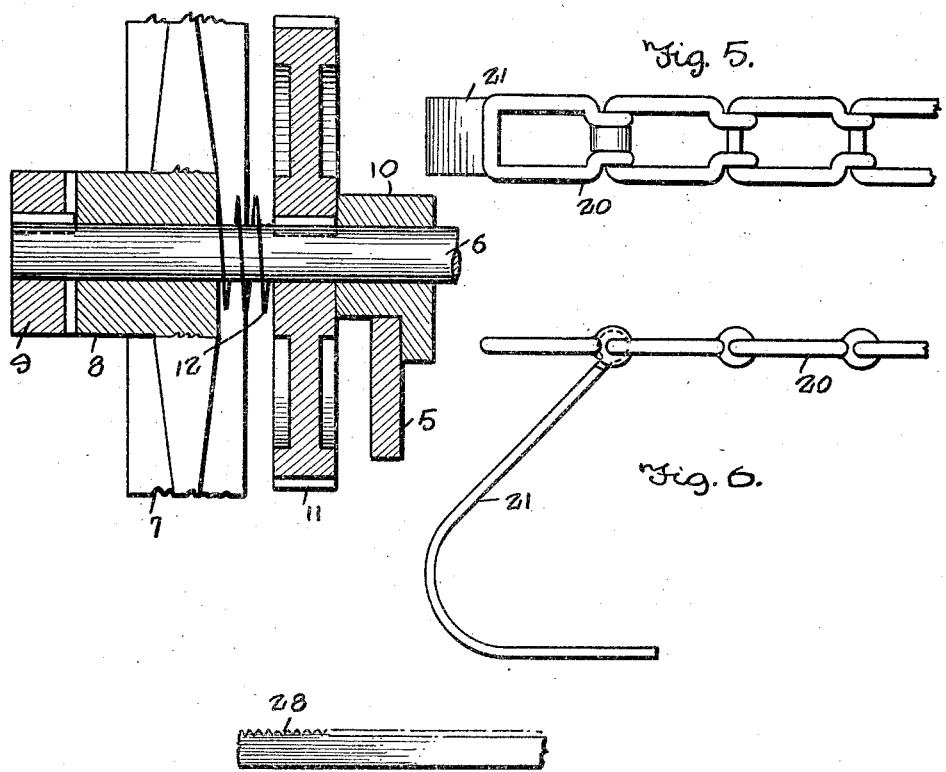

Patented June 1, 1926.

1,586,913

UNITED STATES PATENT OFFICE.

LEVI NICHOLS, OF EDINBURG, TEXAS.

STALK CUTTER.

Application filed November 9, 1925. Serial No. 67,936.

This invention relates to improvements in stalk cutters, and has more particular reference to a stalk cutting machine adapted to be drawn over a field for cutting into small sections stalks of weeds and plants which have been previously chopped down.

It is a common practice to chop down the stalks of weeds and plants and then remove the same from a field in order that the stalks may not interfere with the plowing and other operations necessary to prepare the field for planting. This procedure entails the expenditure of a considerable amount of time and expense.

The primary object of the present invention, therefore, is to provide a machine for cutting up into small sections the stalks of plants and weeds which have been previously chopped down, and for depositing the short sections of the stalks upon the field so that the same may be turned under during the plowing operation for assisting in fertilizing the soil and eliminating the necessity of removing the stalks from the field.

A further object of the invention is to provide a machine of the above kind which is extremely simple and durable in construction as well as efficient in operation.

A still further object of the invention is to provide a machine adapted to be drawn over a field and embodying means to automatically lift the stalks from the ground and force the same past cutters for being divided into relatively small sections, and then depositing the sections of the stalks upon the field at the rear of the machine so that the operation may be carried on with facility in a substantially continuous manner.

Still another object of the invention is to provide a cutting machine of the above kind embodying effective means for cutting the stalks into small sections, and wherein provision is made for preventing damage to the knives in case hard objects, such as stones, should be conveyed and forced therebetween.

Other objects will appear as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views.

Figure 3 is a transverse section taken on the line 3—3 of Figure 2.

Figure 4 is an enlarged fragmentary detail view showing one of the supporting wheels and adjacent parts in transverse section.

Figure 5 is an enlarged fragmentary plan view of one of the conveyor chains.

Figure 6 is a side elevational view of the device shown in Figure 5; and

Figure 7 is a fragmentary elevational view of a modified form of knife which may be employed in the machine shown in Figure 1.

Figure 1:
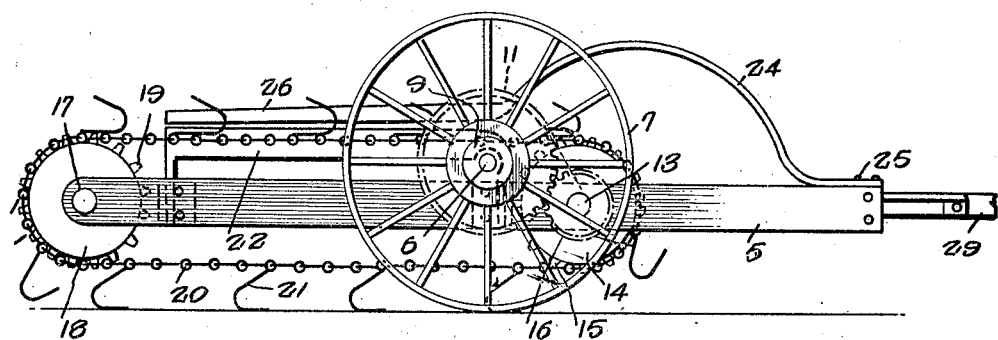
Figure 1 is a side elevational view of a stalk cutting machine constructed in accordance with the present invention.

Referring more in detail to the drawings, the present invention embodies a rigid rectangular frame 5 preferably of longitudinally elongated form as shown and suitably rigidly secured to a transverse axle 6 which is disposed intermediate the ends of the frame and has its ends projecting outwardly beyond the sides of the latter. Journaled upon the projecting end portions of the axle 6 are a pair of ground engaging supporting wheels 7 which have ratchet clutch elements 8 rigid with the outer ends of the hubs thereof and arranged to cooperate with corresponding clutch elements 9 fixed upon the outer ends of the axle 6 as shown whereby, upon forward travelling movement of the machine the rotation of the supporting wheels 7 will be transmitted to the axle 6, and whereby the supporting wheels 7 may be allowed to freely rotate in a backward direction without causing rotation of axle 6. The axle 6 is preferably journaled in suitable bearings 10 fixed to the side members of the frame 5, and secured upon the axle 6 in spaced relation to and at the inner side of each of the supporting wheels 7 is a relatively large spur gear 11. A helical compression spring 12 is disposed upon the axle 6 between each gear 11 and the adjacent supporting wheel 7 so as to force the latter laterally outwardly to yieldingly engage its clutch element 8 with the adjacent clutch element 9. It is thus apparent that the springs 12 will yieldingly allow inward movement of the supporting wheels 7 so that the rachet elements 8 may ratchet past the cooperating elements 9 when said supporting wheels rotate backwardly. Thus, when backing the machine the rotation of the supporting wheels will not be transmitted to the axle 6, and when making turns the inside wheel may be allowed to rotate backwardly while the outside wheel is causing forward rotation of the axle 6, as is necessary when making short turns.

Journaled in the frame 5 directly in front of the axle 6 and spaced rearwardly from the front member of the frame 5 is a transverse shaft 13 upon which is secured a roller or drum 14 having a plurality of sets of sprocket teeth 15 thereon in uniformly spaced relation and substantially from end to end. The drum 14 with its teeth 15 thus constitutes the equivalent of a plurality of sprocket wheels secured upon the shaft 13, but is employed in lieu of the sprocket wheels for a purpose which will later become apparent. Fixed upon the projecting ends of the shaft 13 are spur gears or pinions 16, each of which meshes with the adjacent gear 11 so that the axle 6 drives the shaft 13 at both ends.

A further transverse shaft 17 is journaled in the rear end of the frame 5 and has a drum 18 secured thereon between the side members of the frame. The drum or roller 18 is similar to the drum or roller 14 and has a plurality of sets of sprocket teeth 19 thereon so that each set of teeth on the drum 18 is longitudinally alined with a set of teeth on the drum 14. Passing about the rollers 14 and 18 and respectively engaging alined sets of teeth thereon are a plurality of sprocket chains 20. These sprocket chains are of endless form and each has a plurality of stalk lifting and conveying hooks 21 pivoted thereto at suitable intervals. The hooks 21 are pivoted to swing in a plane parallel with the plane of the chain which carries them, and said hooks are further so arranged as to face forwardly when travelling forwardly below the frame and to face rearwardly when travelling rearwardly above the frame as clearly shown in Figure 1. The rollers 14 and 18 dispose the lower flight of each of its chains 20 in sufficiently close proximity to the ground that the hook may swing downwardly into engagement with the ground as shown in Figure 1 for effectively engaging the stalks and conveying the same forwardly and upwardly and then rearwardly when said chains are driven by rotation of the forward shaft 13 upon forward travelling movement of the machine.

Figure 2:
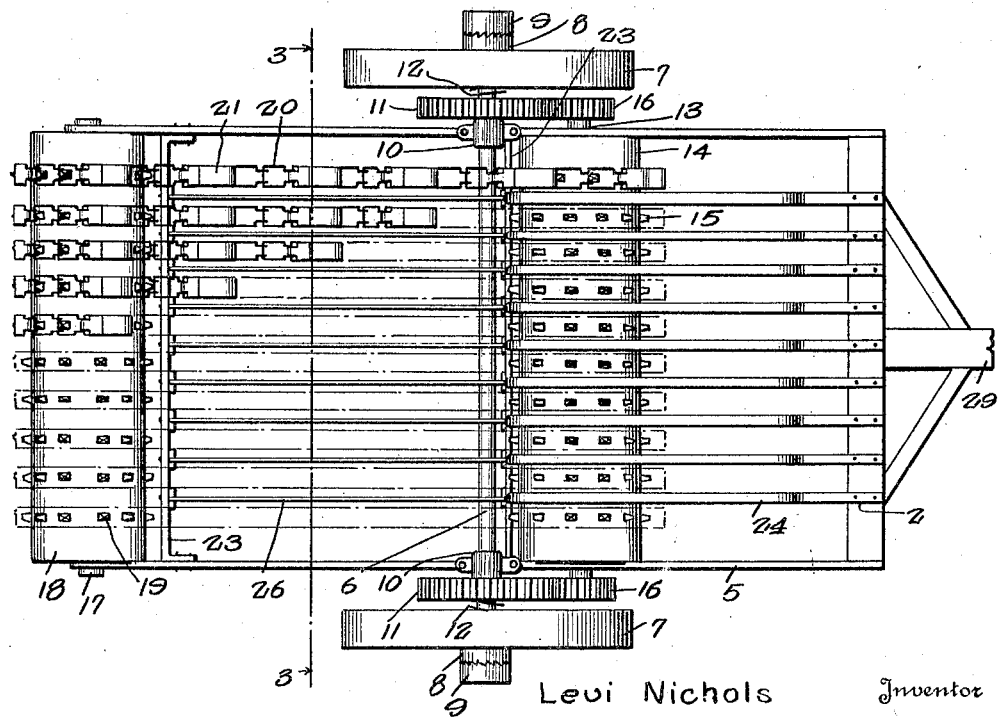
Figure 2 is a top plan view thereof.

A plurality of knives 22 are rigidly supported by the frame 5 in longitudinally extending spaced parallel relation so that one knife 22 is disposed between each pair of the adjacent chains 20 as illustrated clearly in Figure 2. The knives 22 preferably have their ends rigidly attached to transverse bars 23 which rigidly connect the side members of the frame 5 respectively directly in front of the roller 18 and directly rearwardly of the roller 14. It is also noted that the knives 22 are disposed with their cutting edges uppermost and in a horizontal plane substantially coincident with the plane in which the upper flights of the chains 20 travel.

A plurality of parallel spaced leaf springs 24 are disposed between the sides of the frame 5 at the forward end of the latter and so as to extend longitudinally of the frame. These springs 24 have their forward ends rigidly fastened to the front frame member as at 25, and rigid with the free rear ends of said springs are longitudinally disposed knives 26, each of which is disposed above and cooperates with one of the knives 22. The springs 24 are preferably of upwardly curved or arched form as shown so as to provide sufficient clearance in front of the drum 14 to permit the hooks 21 to carry the stalks upwardly in front of said roller 14 and then rearwardly to the knives. The springs 24 are so tensioned as to yieldingly force the upper knives 26 toward the lower knives 22 so that the rear end of each upper knife 26 is engaged with the rear end of the cooperating lower knife 22 whereby complete severing of a stalk passing between said knives is ensured.

The springs 24 further dispose the forward ends of the knives 26 in slightly spaced relation to the forward ends of the lower knives 22 whereby the stalks may be readily forced between the knives upon being carried rearwardly by the hooks 21 of the chains 20.

While the knives shown in Figures 1 to 3 inclusive are shown as provided with smooth cutting edges, the same may be provided with saw-tooth cutting edges as indicated at 28 in Figure 7. The use of knives with saw-tooth cutting edges may be found more desirable under certain conditions such as when effecting cutting of tough stalks of certain plants. Any suitable means may be provided for facilitating pulling of the machine, such as a shaft tongue 29 rigidly attached to the front end of the frame 5 as shown in Figures 1 and 2.

In operation, the machine is suitably drawn forwardly over the field so as to cause rotation of the supporting wheels 7, and this rotation of the supporting wheels is transmitted to the front shaft 13 through the clutches and gearing described. Rotation of shaft 13 causes rotation of the forward roller 14 in a counter-clockwise direction so that the upper flights of the chains 20 move rearwardly and the lower flights thereof move forwardly. As the hooks 21 move downwardly and forwardly at the rear end of the machine, they will swing downwardly into engagement with the ground and in proper position to engage the stalks which have been previously chopped down, and then convey the same upwardly and outwardly and then rearwardly between the cooperating pairs of knives 22 and 26. As the hooks force the stalks rearwardly between the knives the stalks are effectively severed into a plurality of relatively short sections which are then conveyed rearwardly from the knives and again deposited on the ground. Should any relatively hard objects such as stones or the like be conveyed to the knives, the upper knives 26 will be allowed to readily yield upwardly by the springs 24 so as to prevent undue damage to the knives.

As various other features of the operation of the machine have been dealt with as the description progressed, it is believed that the construction and operation as well as the advantages of the invention will be readily appreciated by those skilled in the art.

Minor changes may be made without departing from the spirit and scope of the invention as claimed.

What I claim as new is:

1. In a stalk cutting machine of the character described, a wheeled supporting frame, means carried by the frame for cutting stalks into short sections, and means carried by the frame for engaging chopped-down stalks and conveying the same to said cutting means, said stalk-cutting means comprising a plurality of knives mounted longitudinally of the frame in spaced relation and disposed in superposed pairs, and spring means for supporting the upper knife of each pair whereby the latter may yield upwardly away from the lower knife cooperating therewith.

2. In a saw cutting machine of the character described, a wheeled frame, a pair of transverse shafts journaled in the frame in spaced relation and each having a plurality of spaced sets of sprocket teeth rotatable thereby, endless chains passing around the shafts and engaging said sprocket teeth, hooks hinged to the sprocket chains adapted to engage the stalks lying upon the ground and convey the same forwardly and upwardly and then rearwardly, means for driving one of said shafts, and stalk cutting means mounted on the frame between said chains for severing the stalks into short sections as the same are conveyed rearwardly by said hooks.

3. A stalk cutting machine of the character described, comprising a longitudinally elongated rectangular frame, a transverse axle journaled in the frame intermediate the ends thereof, a shaft journaled in the frame directly in front of the axle and rotatably geared to the latter, supporting wheels for the frame journaled upon the ends of the axle and movable laterally of the frame upon the latter, yieldable means to normally force the supporting wheels outwardly, ratchet clutch elements rigid with the hubs of said supporting means, and cooperating ratchet clutch elements rigid with the ends of the axle and normally engaged by the clutch elements of the wheels by means of said yieldable means, and stalk conveying and cutting means mounted on the frame, said stalk conveying means embodying endless conveying elements in operative relation to said transverse shaft.

4. A stalk cutting machine of the character described, comprising a frame, longitudinal upwardly curved springs having their forward ends attached to the forward end of the frame, longitudinal knives rigid with the rear ends of said springs, further knives rigidly mounted in the frame and each cooperating with one of said first named knives for severing stalks into short sections when the latter are conveyed rearwardly between the cooperating pairs of said knives, and means carried by the frame for engaging chopped down stalks and for conveying the same forwardly and upwardly and then rearwardly between the knives.

In testimony whereof I affix my signature.

LEVI NICHOLS.